H. J. Case,
Reaper-Knife Sharpener.
N° 80,596.   Patented Aug. 4, 1868.

Witnesses:
Jno. D. Patten
S. W. Pool

Inventor:
Henry J. Case
By atty A. B. Stoughton

United States Patent Office.

HENRY J. CASE, OF AUBURN, NEW YORK, ASSIGNOR TO HENRY RICHARDSON, OF SAME PLACE.

Letters Patent No. 80,596, dated August 4, 1868.

IMPROVEMENT IN CLAMPING KNIVES OR CUTTERS OF MOWING-MACHINES WHILE BEING GROUND.

*The Schedule referred to in these Letters Patent and making part of the same.*

TO ALL WHOM IT MAY CONCERN:

Be it known that I, HENRY J. CASE, of Auburn, in the county of Cayuga, and State of New York, have invented certain new and useful Improvements in Clamping the Bars of Reaping-Machines for the Purpose of Grinding the Sickle-Sections or Cutters; and I do hereby declare the following to be a full, clear, and exact description of the same, reference being had to the accompanying drawings, making a part of this specification, in which—

Similar letters of reference, where they occur in the separate figures, denote like parts in all of them.

My invention relates to a cheap and simple way of clamping and unclamping a reaper-bar to and from the rolling or hinged bar, by which the sections or cutters on said reaper-bar are properly and successively brought to and moved from the grinding-stone or wheel.

To enable others skilled in the art to make and use my invention, I will proceed to describe the same, with reference to the drawings.

Figure 1:
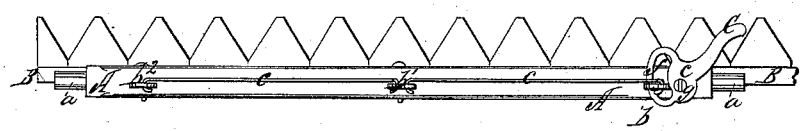
Figure 1 represents the clamping-bar and sickle in elevation, with the devices attached for operating the clamps.
Figure 2:
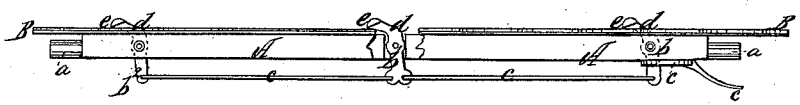
Figure 2 represents a top plan of the same.
Figure 3:
Figure 3 represents one of the clamping-hooks detached.

The bar A, to which the sickle or sickle-bar B is clamped, may have journals $a\ a$ upon it, so that it may roll in the swing-frame, by which it is moved to or from the grinding-wheel or stone. In or to the bar A are pivoted three clamps $b\ b^1\ b^2$, which are connected together by rods $c\ c$. The opposite ends of these clamps from those that are connected by the rods $c$, are bent horizontally, as seen at $d$, fig. 2, and their extreme bent ends are turned up vertically, as seen at $e$, fig. 3. The shank of the clamp $b$ is round, and may have a friction-roller upon it, if found desirable. This rounded shank passes through an eccentric slot, $f$, in a cam-lever, $e$, that is pivoted to the roller-bar at $g$, so that, by working said lever $e$, the series of clamps is brought tight up against the sickle, and firmly holds it to the bar A. By reversing the action of the lever, the sickle is as readily unclamped, and can be moved along on the bar A. The clamps serve as a support for the sickle whilst it is shifted along to bring the sections successively and in right position to the grinder.

Though the force that does the clamping is applied through the rods $c\ c$, yet the clamps bind against the sickle or cutters in a direction at right angles to the line of the rods. This is done by the peculiar shape of the clamps themselves; and the expedition with which the sickle or sickle-bar is clamped and released, makes it a very valuable acquisition in grinding sickle-sections.

Having thus fully described the nature of my invention, what I claim therein as new, and desire to secure by Letters Patent, is—

In combination with the clamping and holding-bar A, the series of clamping-hooks, actuated through a common lever for fastening and releasing the reaper-bar or sickle, substantially in the manner and for the purpose described.

HENRY J. CASE.

Witnesses.
HORACE T. COOK,
CHAS. RICHARDSON.